United States Patent Office 3,252,956
Patented May 24, 1966

3,252,956
CYCLOBUTENE HOMOPOLYMERS AND PROCESS
FOR PREPARING SAME
Giulio Natta, Giorgio Mazzanti, and Gino Dall'Asta,
Milan, Italy, assignors to Montecatini Società Generale
per l'Industria Mineraria e Chimica, Milan, Italy, a
corporation of Italy
No Drawing. Filed Oct. 23, 1962, Ser. No. 232,610
Claims priority, application Italy Oct. 26, 1961
23 Claims. (Cl. 260—93.1)

The present invention relates to certain new high molecular weight polymeric products containing linear enchainments of cycloaliphatic groups, more particularly, crystalline polycyclobutenes having a sterically regular structure.

The present invention further relates to a process for preparing these polymeric products.

Cyclobutene polymers of any type or suitable processes for polymerizing this cycloolefin have not heretofore been reported in the literature; and, indeed, because the characteristics of this monomer do not favor polymerization to linear, high molecular weight polymers, the preparation of such cyclobutene polymers could not be foreseen.

It is known that the higher homologues of cyclobutene, such as, e.g., cyclopentene or cyclohexene, do not polymerize in the presence of coordination catalysts. However, when these compounds are employed in the presence of cationic catalysts of the Friedel-Crafts type (e.g. $AlCl_3$), only low molecular weight polymers composed of dimers, trimers, tetramers and pentamers having the consistency of lubricating oils, are generally poduced.

Moreover, due to the presence in cyclobutene of both an olefinic double bond and a four carbon atom ring, which ring posseses an inner tension and, therefore, a pronounced tendency to open with the resulting formation of butadiene structures, it could not be foreseen that it would be possible to produce polycyclobutene having structures possessing enchained cyclobutane rings, because also cis-1,4, trans-1,4 or 1,2-polybutadiene structures, mixed structures of these types or non-linear cross-linked structures were predictable.

Moreover it could not be predicted that a polycyclobutene having a polycyclobutane ring structure could be crystalline, nor could the type of this crystallinity be foreseen.

It is therefore an object of the present invention to provide novel homopolymers prepared by polymerization of cyclobutene.

A further object is to provide a polymerization process for obtaining these homopolymers.

Other objects of the present invention and the advantages of this invention will become hereinafter apparent.

We have now surprisingly found that by using particular catalytic systems it is possible to prepare high molecular weight, linear homopolymers of cyclobutene.

These homopolymers are characterized by the presence of macromolecular chains essentially (>95%) consisting of enchainments of cyclobutane rings of the following type:

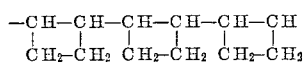

This structure is arrived at from an examination of the infrared absorption spectrum obtained from hot pressed laminae of the polymer. This spectrum does not exhibit absorptions attributable to olefinic double bonds which should be present if the polymer posssesses one of the aforementioned structures of the polybutadiene type, which are formed by the opening of the cycloolefinic ring.

This spectrum reveals the presence of methylenic groups (band at $6.97\mu$) which are attributable to the $CH_2$ groups present in the ring.

In addition, X-ray examination, carried out on polymer powders which are annealed at 180° C., indicates the presence of a high crystallinity. Depending on the type of catalytic system employed, it is possible to obtain polycyclobutenes having identical chemical structures, but exhibiting differences in their crystalline structure. Thus, for instance, upon employing a catalytic system comprising $VCl_4$ and $Al(n-C_6H_{13})_3$, a polycyclobutene is formed whose spots are at lattice distances of: 5.57 A. (f.f.); 4.07 A. (md.); 2.27 A. (d.) (wherein (f.f.)=very strong; (md.)=medium weak; (d.)=weak).

In contrast, by employing a catalyst prepared from vanadium triacetylacetonate and $Al(C_2H_5)_2Cl$, a polycyclobutene is obtained whose main spots are at lattice distances of: 9.41 A. (md.); 5.50 A. (f.); 5.06 A. (m.f.) and 4.0 A. (d.) (wherein (m.f.)=medium strong; (f)=strong).

Since these spectra do not correspond to any of the other four structural forms of polybutadiene, they are attributed to the aforementioned linear polymer containing enchainments of cyclobutane rings.

The crystallinity of the polymer is due to a steric structural regularity of the tertiary carbon atoms of the cyclobutane rings. This regularity is caused by the stereospecificity of the catalyst used for the polymerization.

The polymerization process is carried out in the presence of catalysts prepared from (1) compounds of transition metals belonging to group IV or V of the Periodic Table according to Menedeléeff and (2) metallorganic compounds of metals of groups IA (i.e., Li, Na, K, Rb, Cs and Fr), II and IIIA of the same Periodic Table.

As some non-limiting examples of transition metal compounds which can be used in the preparation of the catalysts, there can be mentioned: $TiCl_3$, $VCl_4$, $VOCl_3$ and vanadium acetylacetonate.

As suitable metallorganic compounds there can be used, e.g., $Al(C_2H_5)_3$, $Al(i-C_4H_9)_3$; $Al(n-C_6H_{13})_3$; $Al(C_2H_5)_2Cl$, $Be(C_2H_5)_2$, $Li(n-C_4H_9)$, etc.

Particularly satisfactory results are obtained by using the catalytic systems prepared from vanadium compounds and more particularly from $VCl_4+Al(n-C_6H_{13})_3$ or $Al(C_2H_5)_2Cl$+vanadium triacetylactonate.

The molar ratio between the two components in the catalyst should be kept between certain values, more particularly: transition metal compound/metallorganic compound 1:1 to 1:20, preferably 1:2 to 1:10. In case the metallorganic compound is a metallalkyl compound said ratio should be comprised preferably between 1:4 and 1:10, whereas when a metallalkyl halide is employed, said ratio should be comprised between 1:2 and 1:4.

Catalytic systems prepared from transition metal compounds of group IV (particularly titanium) generally yield polycyclobutene together with polybutadiene-1,4.

The polymerization process according to the present invention is carried out at a temperature between —80° C. and +50° C.

In order to avoid a too rapid polymerization it is preferable to operate in the range of —60° C. and 0° C.

The polymerization can be carried out either in the absence or in the presence of diluents or solvents which may be preferably an aliphatic or aromatic hydrocarbon.

Polycyclobutene obtained according to the present invention, if prepared in the presence of heterogeneous catalysts, is substantially insoluble in and is substantially not swollen, either at room temperature or at warmer temperatures (80° C.), by toluene, carbon tetrachloride, dioxane, dimethylformamide, n-octane, decahydronaphthalene and various other solvents. The polymer is swollen, however, but not dissolved in tetrahydronaphthalene, bromobenzene, acetophenone, anisole and similar solvents. The polymers melt at temperatures of about 200–210° C. At these temperatures, it can be molded in a press into white transparent laminae.

The polycyclobutene, obtained in the presence of a hydrocarbon soluble catalytic system, has a lower melting temperature (150–160° C.) and is soluble in high boiling solvents at their boiling temperature, such as tetrahydronaphthalene or chlorobenzene. At room temperature this polymer is practically insoluble in all common solvents.

The polymers of the present invention can be extruded, especially when they are plasticized into filaments, fibers, laminae and other shaped articles.

At temperatures about 10° C. higher than their melting temperature, the polycyclobutenes begin to decompose, thus becoming yellow or maroon. This transformation is often accompanied by typical odors which are present when polybutadiene is heated to decomposition. This leads us to believe that at such temperatures the opening of the cyclobutanic ring takes place.

The following examples are given to illustrate the present invention without limiting its scope. (The percentages of crystallinity indicated in the examples are referred to the polycyclobutane structures.)

Example 1

The polymerization vessel is a 250-cc. three-necked flask provided with an agitator, a dropping funnel and a tube for introducing nitrogen. The flask is kept under dry nitrogen and is cooled to −60° C.

10 g. (185 millimols) of liquid cyclobutene, which has been previously distilled on calcium chloride, and 50 cc. of anhydrous heptane are then introduced.

The mixture is kept in agitation and a catalytic mixture is then introduced through the dropping funnel which is cooled to −60° C. This catalytic mixture is previously prepared in a flask at −30° C. by reacting 3.6 millimols of $VCl_4$ dissolved in 30 cc. of anhydrous n-heptane while agitating with 9.0 millimols of $Al(n-C_6H_{13})_3$.

After the addition of the catalyst, a rapid polymerization occurs with the precipitation of white powder. To complete the reaction, the whole mass is kept under these polymerization conditions for an additional hour and is then poured into 1 liter of methanol containing 10 cc. of conc. hydrochloric acid.

When the precipitated polymer becomes white, it is filtered and suspended in further amounts of methanol which contain hydrochloric acid.

After a boiling for 1 hour, the polymer is filtered, washed with methanol and dried under suction of a water pump while on a water bath. The density of the laminae obtained by hot molding of the polymer is 1.06.

9.4 g. (corresponding to a conversion of 94%) of a white polymer, which can be ground into a white powder, are obtained.

The polymer is insoluble both at room temperature and at 80° C. in all the common solvents. It can be swollen even at room temperature in some organic solvents such as, e.g., bromobenzene, acetophenone, tetrahydronaphthalene and anisole.

Upon heating to 200–210° C. the polymer synterizes and, if the pressure of a press is applied at the same time, it melts without decomposition giving transparent white laminae.

When heated to higher temperature (about 220° C.) the polymer shows signs of decomposition (yellow or maroon colors, release of vapors, etc.); the higher the temperature, the more evident these signs.

A sample which is annealed under vacuum at 180° C., upon X-ray examination exhibits a powder spectrum characteristic of a polymer with a high crystallinity (higher than 75%).

In this spectrum the main reflections are observed at lattice distances of: 5.57 A. (f.f.); 4.07 A. (md.); 2.27 A. (d.) (wherein (f.f.), (md.) and (d.) have the meanings given above).

A hot-molded lamina of the polymer upon infrared examination, exhibits a total absence of double bonds and indicates the presence of a strong band at 6.97µ, which band is attributable to methylenic groups present in the ring.

From the aforementioned characteristics, the polymer is attributed to have a structure containing enchainments of cyclobutanic rings, wherein the tertiary carbon atoms (asterisks) possess a stereoregularity indicated as follows:

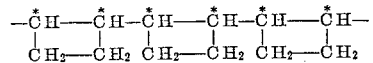

Example 2

A three-necked 100-cc. flask provided with an agitator, dropping with cooling jacket and nitrogen inlet tube is place under a nitrogen atmosphere and is cooled to −50° C.

40 cm.³ of toluene, 3.6 millimols of vanadium acetylacetonate and 18.0 millimols of diethylaluminum monochloride are introduced and carefully agitated. 12.5 cm.³ (10.0 g.) of cyclobutene are slowly added dropwise through the dropping funnel. When all cyclobutene has been added, the whole mass is kept at −50° C. for 5 hours.

The reaction mixture is poured into 200 cm.³ of methanol containing 10 cm.³ of concentrated hydrochloric acid.

The precipitated polymer is filtered, washed with methanol and vacuum dried at 50° C. 10.0 g. of polymer in the form of a white powder are thus obtained.

The polymer so obtained is insoluble in many solvents, even at their boiling point, such as, e.g., n-heptane, cyclohexane, methanol, acetone, methylethylketone, diethylether, tetrahydrofurane, dimethylformamide and carbon tetrachloride.

It is, however, soluble at the boiling point (but reprecipitates at room temperature) in toluene, anisole, tetrahydronaphthalene and cholrobenzene.

The polymer has an intrinsic viscosity, determined in tetrahydronaphthalene at 135° C., of 0.2.

The density of the laminae obtained by hot molding the The polymer has a melting temperature, in the pressed state, of about 150–160° C.

A prolonged heating of the polymer at temperatures higher than 160° C. causes its slow decomposition.

By X-ray examination the polymer is shown to be highly crystalline (degree of crystallinity 50–60%). The X-ray powder spectrum shows main spots at the following lattice distances: 9.41 A. (md.); 5.50 A. (f); 5.06 A. (m.f.); 4.0 A. (d) (the symbols md., f., m.f., and d. having the same meaning as given above.)

This infrared spectrum of the polymer reveals:

(a) A complete absence of double bonds;
(b) A band at 6.97 microns, characteristic of methylenic groups in the ring;
(c) A band at 3.78 microns, characteristic of the cyclic configurations.

The structure assigned to this polymer, on the basis of the aforementioned results and according to the nomenclature given by M. L. Huggins, J. Polymer Sci. 8, 257 (1952), is that of a sterically ordered polycyclobutylenamer-2:

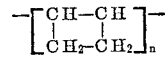

wherein $n$ indicates the number of recurring units.

Example 3

A catalytic system previously prepared from 1 millimol of δ-$TiCl_3$ (solid solution corresponding to the composition $3TiCl_3+AlCl_3$), 60 cm.³ of n-heptane and 3 millimols of Al(C₂H₅)₃ is placed into a thick glass tube together with 3.0 cm.³ (2.4 g.) of cyclobutene.

The tube is sealed in a flame and is kept at 45° C. for 12 hours. The reaction product is then poured into 300 cm.³ of methanol and the polymer is isolated as described in Example 2.

2.0 g. of a crystalline polymer are thus obtained. The X-ray and the infrared examination show that it is a mixture of the crystalline polycyclobutene (having crystalline structure of the type described in Example 1) and of crystalline trans-1,4-polybutadiene together with few units (about 5%) of cis-1,4-polybutadiene.

The crystalline polycyclobutene amounts to not less than 20% by weight of the total polymer.

The I.R. measurements in the above examples were carried out with "Perkin-Elmer" spectrophotometers, and, more particularly, with the 221-model provided with an NaCl-optic and with the 21-model provided with CaF₂-optic (the latter one for the 6.97μ band identification).

Many variations and modifications can, of course, be practiced without departing from the scope and spirit of the present invention.

Having thus described the invention, what is desired to secure and claim by Letters Patent is:

1. A high-molecular weight, linear polycyclobutylenamer-2 having isotactic structure.

2. A crystalline high-molecular weight, linear homopolymer of cyclobutene having macromolecular chains consisting of cyclobutanic ring enchainments characterized by the formula:

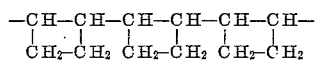

3. The high-molecular weight, linear homopolymers of claim 2 further characterized in that their X-ray powder spectrum exhibits main spots at lattice distances of 5.57 A., 4.07 A., and 2.27 A.

4. The high-molecular weight, linear homopolymers of claim 2 further characterized as having melting points ranging from about 200° to 210° C.

5. The high-molecular weight, linear homopolymers of claim 2 further characterized in that their X-ray powder spectrum exhibits main spots at lattice distances at 9.41 A., 5.50 A., 5.06 A., and 4.0 A.

6. The high-molecular weight, linear homopolymers of claim 2 further characterized as having a melting point ranging from about 150° to 160° C.

7. A process for polymerizing cyclobutene to high-molecular weight, linear homopolymers which comprises polymerizing the cyclobutene in the presence of an effective amount of a catalyst prepared from (1) a vanadium halide or a titanium halide and (2) an organometallic compound of the formula MR$_a$X$_b$ wherein M is metal from Group Ia, IIa, or IIIa, R is alkyl, X is halogen, $a$ is at least 1 and equals the residual valence of the metal M, and $b$ is zero or 1.

8. The process of claim 7 further characterized in that the polymerization is carried out at a temperature ranging from about a —80° to +50° C.

9. The process of claim 8 further characterized in that the polymerization is carried out at a temperature ranging from about —60° to 0° C.

10. The process of claim 7 further characterized in that the transition metal compound is a titanium halide.

11. The process of claim 7 further characterized in that the transition metal compound is a vanadium halide.

12. The process of claim 10 further characterized in that the titanium compound is titanium trichloride.

13. The process of claim 11 further characterized in that the vanadium compound is vanadium tetrachloride.

14. The process of claim 7 further characterized in that the organometallic compound is an aluminum compound.

15. The process of claim 7 further characterized in that the organometallic compound is a beryllium compound.

16. The process of claim 7 further characterized in that the organometallic compound is a lithium compound.

17. The process of claim 14 further characterized in that the aluminum compound is aluminum trihexyl.

18. The process of claim 14 further characterized in that the aluminum compound is aluminum diethyl-monochloride.

19. The process of claim 7 further characterized in that the polymerization is carried out at a temperature ranging from about a —50° C. to —60° C. in the presence of a catalyst prepared from VCl₄ and Al(n-C₆H₁₃)₃.

20. The process of claim 7 further characterized in that the polymerization is carried out in the presence of an organic diluent.

21. The process of claim 20 further characterized in that the diluent is selected from the group consisting of aromatic and aliphatic hydrocarbons.

22. The process of claim 21 further characterized in that the aliphatic hydrocarbon is heptane.

23. The process of claim 21 further characterized in that the aromatic hydrocarbon is toluene.

References Cited by the Examiner

UNITED STATES PATENTS

| | | | |
|---|---|---|---|
| 3,058,963 | 10/1962 | Vandenberg | 260—93.1 |
| 3,074,918 | 1/1963 | Eleuterio | 260—93.1 |

FOREIGN PATENTS 225,022  10/1959  Australia.

JOSEPH L. SCHOFER, *Primary Examiner.*